US010315881B2

(12) United States Patent
Tomimatsu

(10) Patent No.: US 10,315,881 B2
(45) Date of Patent: Jun. 11, 2019

(54) IMAGE FORMING APPARATUS THAT FORMS AND OUTPUTS IMAGES ON A MEDIUM

(71) Applicant: KYOCERA Document Solutions Inc., Osaka (JP)

(72) Inventor: Tetsuo Tomimatsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/959,191

(22) Filed: Apr. 21, 2018

(65) Prior Publication Data

US 2018/0305167 A1 Oct. 25, 2018

(30) Foreign Application Priority Data

Apr. 21, 2017 (JP) ................................. 2017-084179

(51) Int. Cl.
*B65H 45/12* (2006.01)
*G06F 3/12* (2006.01)
*G03G 15/00* (2006.01)

(52) U.S. Cl.
CPC ......... *B65H 45/12* (2013.01); *G03G 15/6582* (2013.01); *G06F 3/1208* (2013.01); *G06F 3/1211* (2013.01); *G06F 3/1256* (2013.01); *G06F 3/1257* (2013.01); *G06F 3/1279* (2013.01); *G06F 3/1285* (2013.01); *B65H 2220/01* (2013.01); *B65H 2511/20* (2013.01); *B65H 2511/512* (2013.01); *B65H 2511/522* (2013.01); *B65H 2701/124* (2013.01);

(Continued)

(58) Field of Classification Search
CPC ................ B65H 45/12; B65H 2220/01; B65H 2511/20; B65H 2511/512; B65H 2511/522; B65H 2701/124; B65H 2701/1241; B65H 2701/12411
USPC .................... 270/1.01, 4, 45, 52.02; 493/405
See application file for complete search history.

(56) References Cited

U.S. PATENT DOCUMENTS 4,775,169 A * 10/1988 Barth ..................... B42D 15/00
283/115
7,087,006 B2 * 8/2006 Manico .................. B42F 5/005
493/397

(Continued)

FOREIGN PATENT DOCUMENTS

| JP | 2007-201761 A | 8/2007 |
|----|---------------|--------|
| JP | 2010-095319 A | 4/2010 |
| JP | 2013-041419 A | 2/2013 |

*Primary Examiner* — Leslie A Nicholson, III
(74) *Attorney, Agent, or Firm* — Hawaii Patent Services; Nathaniel K. Fedde; Kenton N. Fedde

(57) ABSTRACT

Provided is an image forming apparatus that easily performs the work of adjustment so that folding lines do not become an obstacle when looking at an image that is formed on paper after the paper has been folded. A printing-data-input unit that printing data for printing the image is inputted to. A fold-setting unit recognizes a folding pattern, and positions of folding lines on the paper that are used in that folding pattern. A positional-relationship-adjusting unit adjusts at least one of the positions of the folding lines and the printing data so that portions in the image that are not blank and the folding lines do not overlap on the paper. An output unit, after adjustment by the positional-relationship-adjusting unit, forms an image on the paper, and outputs the paper.

9 Claims, 12 Drawing Sheets

(52) U.S. Cl.
    CPC ........... *B65H 2701/1241* (2013.01); *B65H 2701/12411* (2013.01); *B65H 2801/27* (2013.01); *G03G 2221/1696* (2013.01); *G06F 3/1219* (2013.01)

(56) References Cited

U.S. PATENT DOCUMENTS

| | | | | |
|---|---|---|---|---|
| 7,322,924 B2 * | 1/2008 | Manico | ............... | B42F 5/005 |
| | | | | 493/405 |
| 2013/0045851 A1 * | 2/2013 | Hori | ............... | G03G 15/5095 |
| | | | | 493/405 |
| 2013/0293902 A1 * | 11/2013 | Seto | ............... | H04N 1/3873 |
| | | | | 358/1.5 |
| 2014/0005022 A1 * | 1/2014 | Iida | ............... | B65H 37/04 |
| | | | | 493/405 |

* cited by examiner

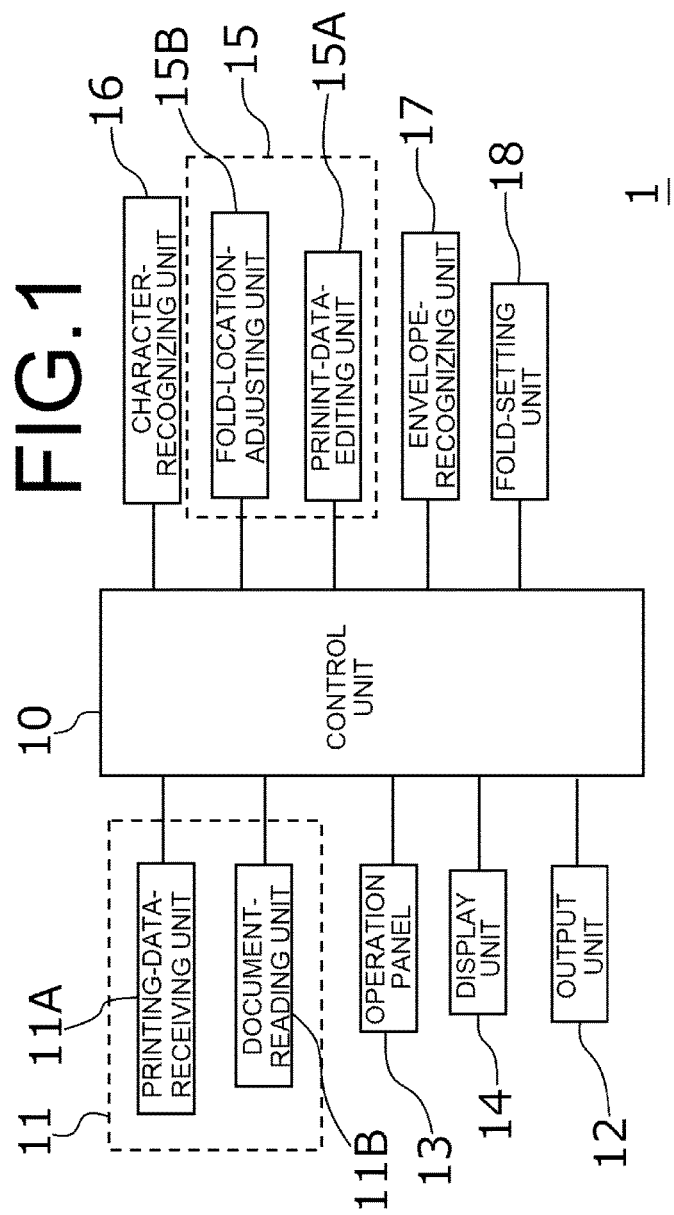

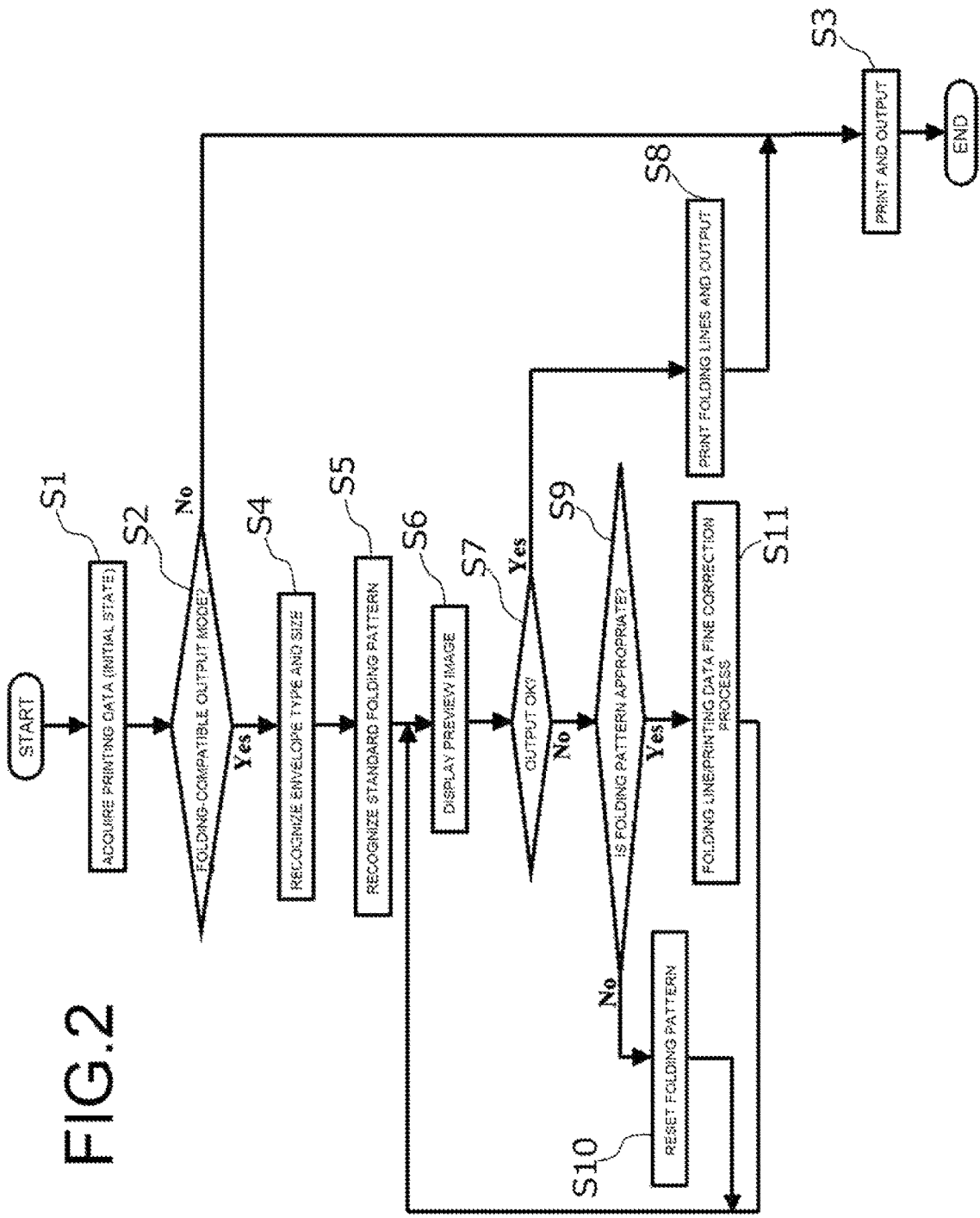

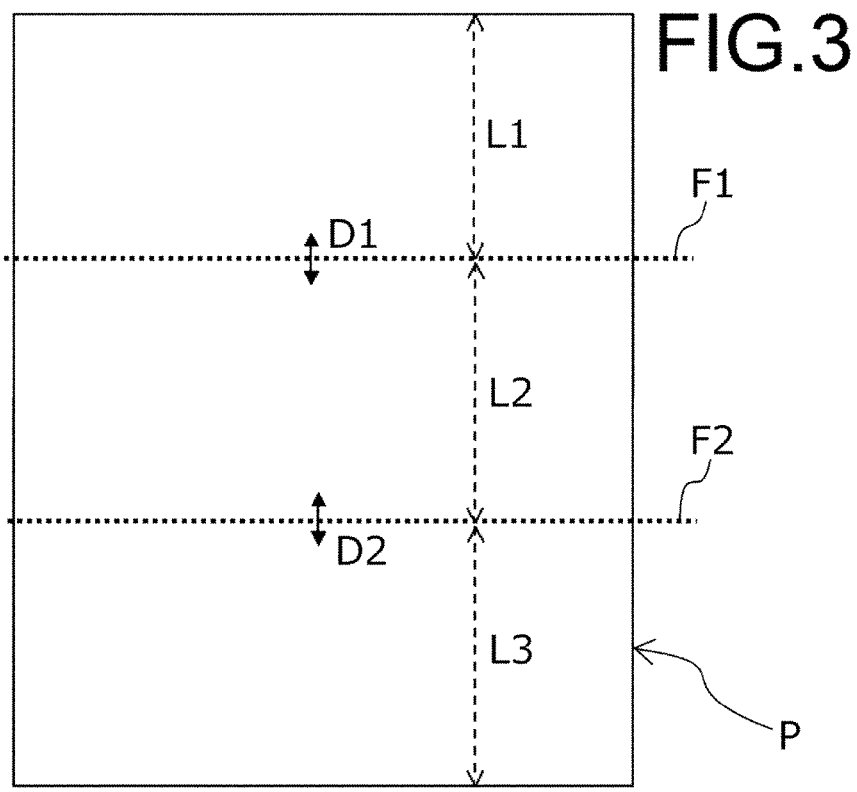

FIG.4A

1.
AAAAAAAAAAAAAAAAAAAAAAAAAAAAAAAAAAA
AAAAAAAAAAAAAAAAAAAAAAAAAAAAAAAAAAAA
AAAAAAAAAAAAAAAAAAAAAAAAA

2.
BBBBBBBBBBBBBBBBBBBBBBBBBBBBBBBBBBBB
BBBBBBBBBBBBBBBBBBBBBBBBBBBBBBBBBBBB
BBBBBBBBBBBBBBBBBBBBBBBBBBBBBB

3.
CCCCCCCCCCCCCCCCCCCCCCCCCCCCCCCCCC
CCCCCCCCCCCCCCCCCCCCCCCCCCCCCCCCCC
CCCCCCCCCCCCCCCCCCCCCCCCCCCCCCCCCC

4.
DDDDDDDDDDDDDDDDDDDDDDDDDDDDDDDDDD
DDDDDDDDDDDDDDDDDDDDDDDDDDDDDDDDDD
DDDDDDDDDDDDDDDDDDDDDDDD

P

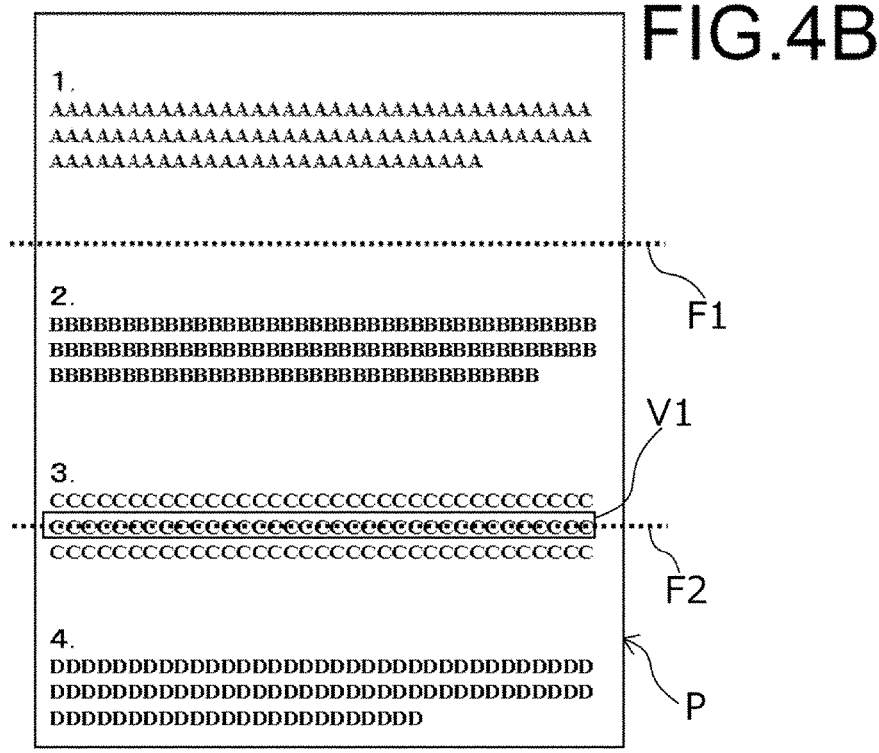

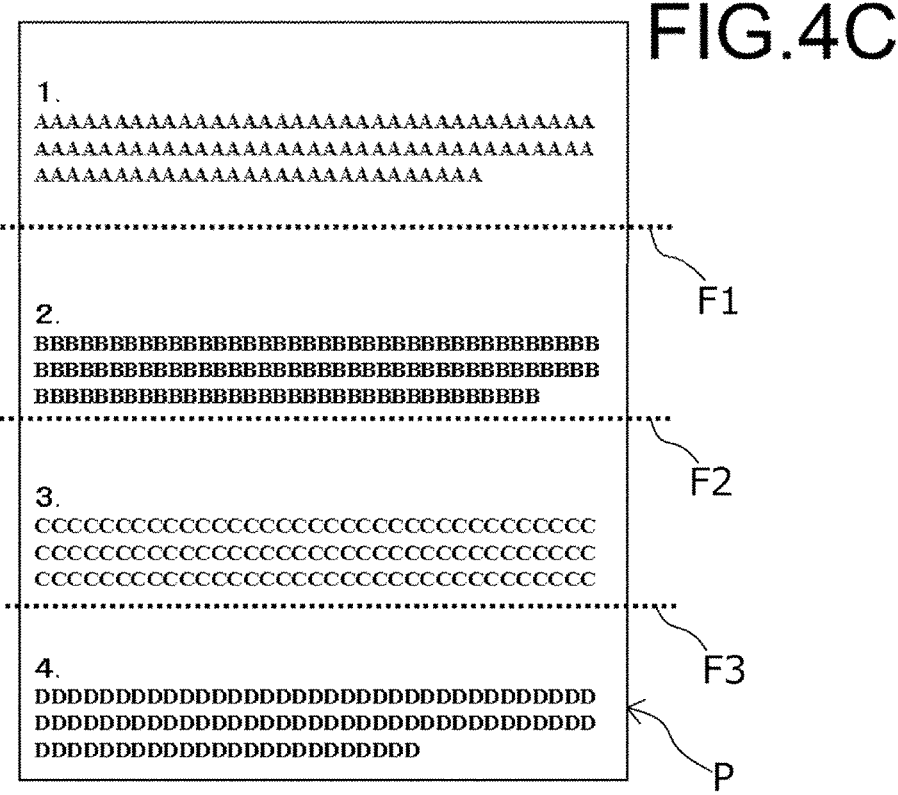

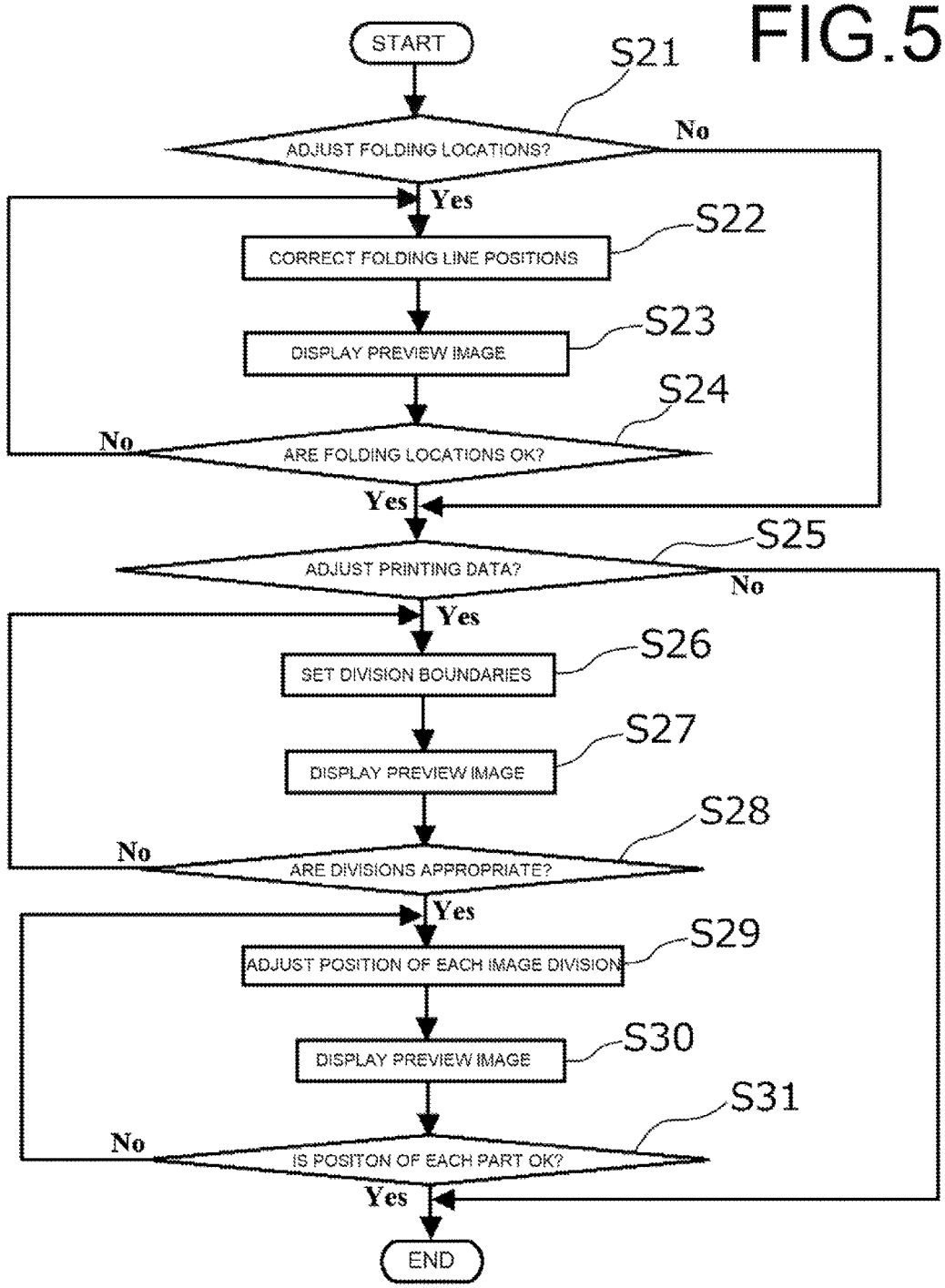

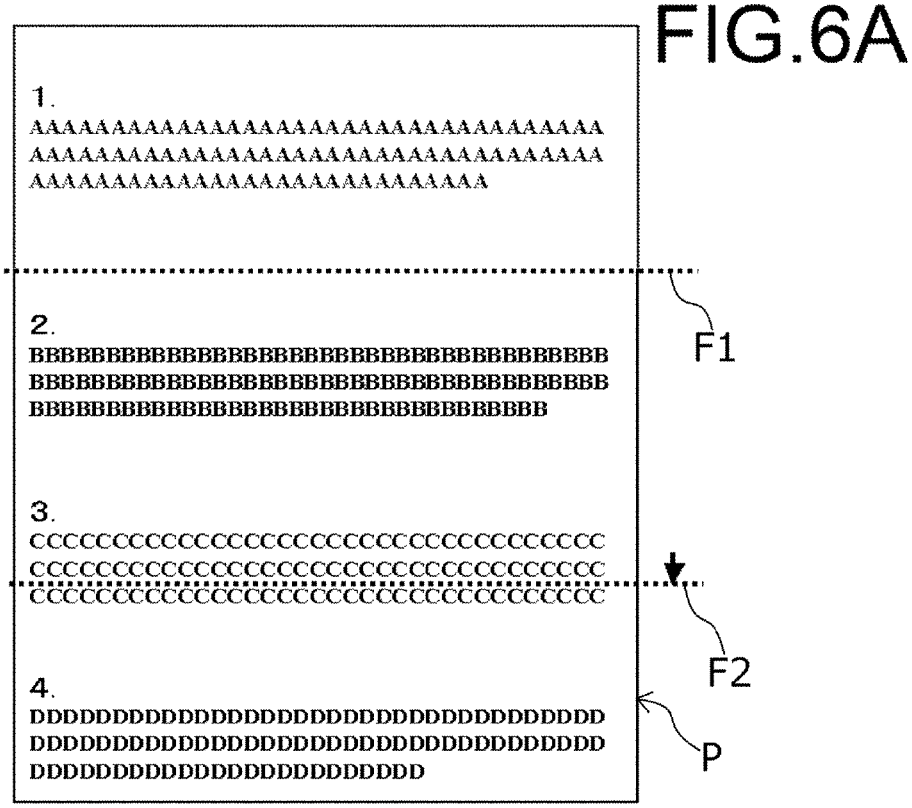

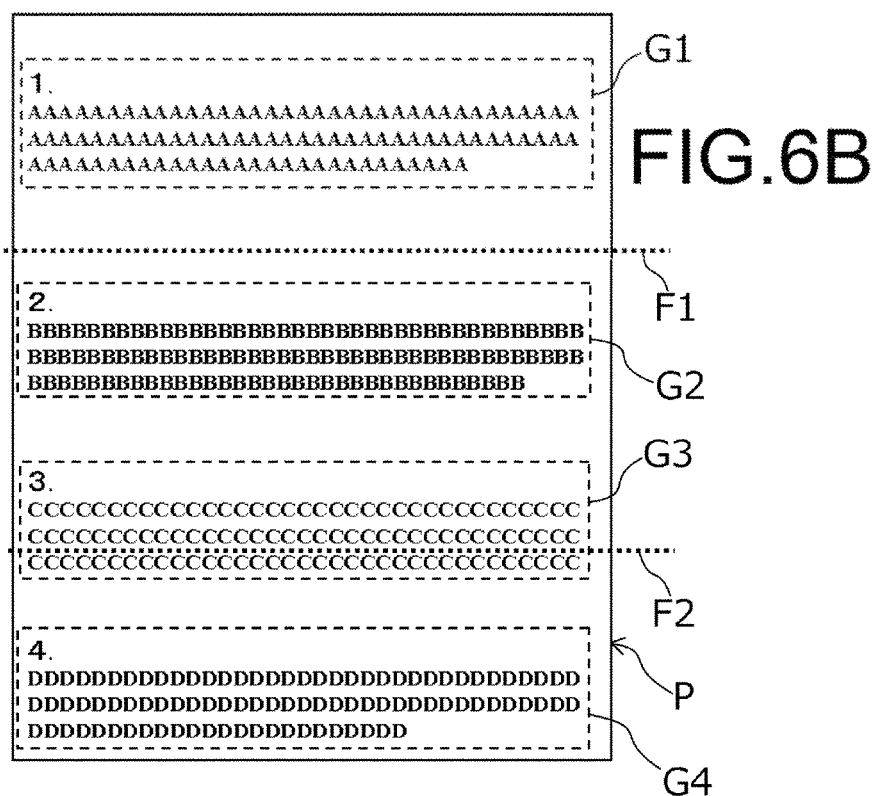

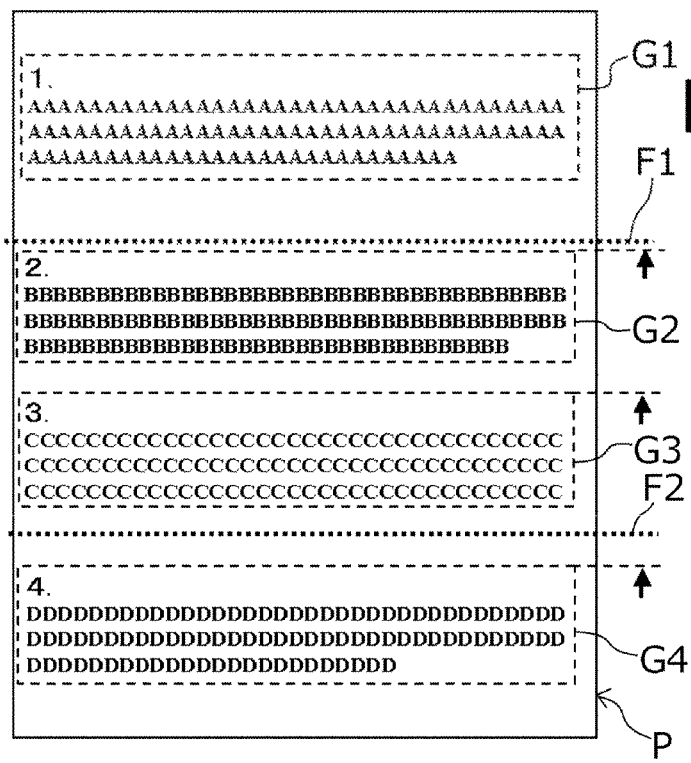

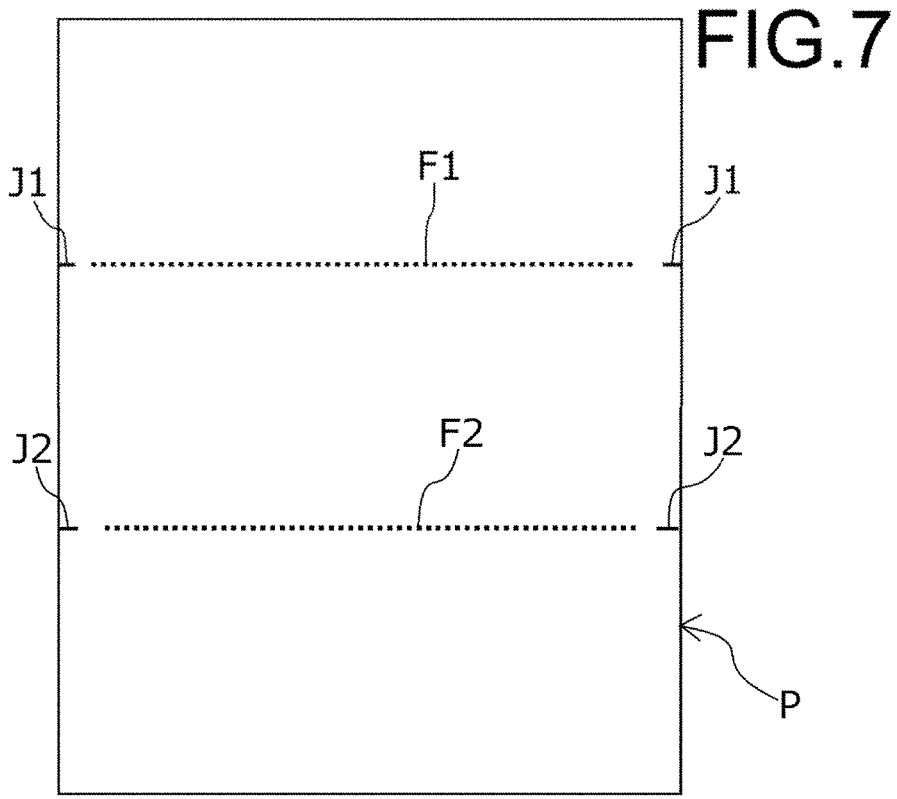

IMAGE FORMING APPARATUS THAT FORMS AND OUTPUTS IMAGES ON A MEDIUM

INCORPORATION BY REFERENCE

This application is based on and claims the benefit of priority from Japanese Patent Application No. 2017-084179 filed on Apr. 21, 2017, the contents of which are hereby incorporated by reference.

BACKGROUND

The disclosure relates to an image forming apparatus that forms and outputs images on a medium.

In a printer, or a multifunction peripheral (MFP: Multifunction Printer) having a printing function that is similar to a printer, images are formed and outputted on rectangular-shaped paper. Paper that is outputted in this way, in some cases may be used as is in that state, however, in other cases may also be accommodated in an envelope and mailed. Typically, when accommodating paper in an envelope, the paper is folded and accommodated in the enveloped in a smaller form. When accommodating one kind (size) of paper in one kind (size) of envelope, there are restrictions on the folding pattern or the folding locations (positions of folding lines) of the paper in the folding pattern. This is because the sizes of the paper and envelope are limited to sizes determined by standards. As typical technology, image forming apparatuses are proposed that enable a user to form images on paper in consideration of these kinds of folding lines.

In one of the typical image forming apparatuses, the positions of the folding lines on the paper are set by the user, and when images to be printed are displayed as preview images before printing, the positions of the folding lines are also displayed. As a result, the user is able to recognize the state after output when the paper is folded. Moreover, during output, the paper actually becomes folded along the folding lines.

In another of the typical image forming apparatuses, the paper size and the envelope size are inputted, and the positions of the folding lines of the paper are set according to the sizes, then the folding lines are displayed on the preview screen before printing. Moreover, in another of the typical image forming apparatuses, first, the size after folding is set, then according to that size, paper having a size that is an integral multiple of that size and positions of images or blank portions on the paper are set. As a result, it is possible to reduce unnecessary blank portions on the outputted paper, and thus it is possible to improve the appearance of images on the paper.

SUMMARY

The image forming apparatus according to the present disclosure is an image forming apparatus that prints an image on paper. The image forming apparatus includes a printing-data-input unit, a fold-setting unit, a positional-relationship-adjusting unit, and an output unit. The printing-data-input unit is a unit that printing data for printing the image is inputted to. The fold-setting unit recognizes a folding pattern as a pattern by which the paper is folded after being outputted, and positions of folding lines on the paper that are used in that folding pattern. The positional-relationship-adjusting unit adjusts at least one of the positions of the folding lines and the printing data so that portions in the image that are not blank and the folding lines do not overlap on the paper. The output unit, after adjustment by the positional-relationship-adjusting unit, forms an image on the paper using the printing data, and outputs the paper.

BRIEF DESCRIPTION OF THE DRAWINGS

FIG. 1 is a block diagram illustrating the configuration of an embodiment of an image forming apparatus according to the present disclosure.

FIG. 2 is an example of a flowchart illustrating operation of a control unit in an embodiment of an image forming apparatus according to the present disclosure.

FIG. 3 is a diagram illustrating a folding pattern when folding a paper in three.

FIG. 4A illustrates an example (example 1) of images displayed on the display unit of an embodiment of an image forming apparatus according to the present disclosure.

FIG. 4B illustrates an example (example 1) of images displayed on the display unit of an embodiment of an image forming apparatus according to the present disclosure.

FIG. 4C illustrates an example (example 1) of images displayed on the display unit of an embodiment of an image forming apparatus according to the present disclosure.

FIG. 5 is an example of a flowchart of a folding-line/printing-data fine correction process that is performed by an embodiment of an image forming apparatus according to the present disclosure.

FIG. 6A illustrates an example (example 2) of images displayed on the display unit of an embodiment of an image forming apparatus according to the present disclosure.

FIG. 6B illustrates an example (example 2) of images displayed on the display unit of an embodiment of an image forming apparatus according to the present disclosure.

FIG. 6C illustrates an example (example 2) of images displayed on the display unit of an embodiment of an image forming apparatus according to the present disclosure.

FIG. 7 is an example of folding line marks that are drawn on paper that is output by an embodiment of an image forming apparatus according to the present disclosure.

DETAILED DESCRIPTION

Figure 6D:
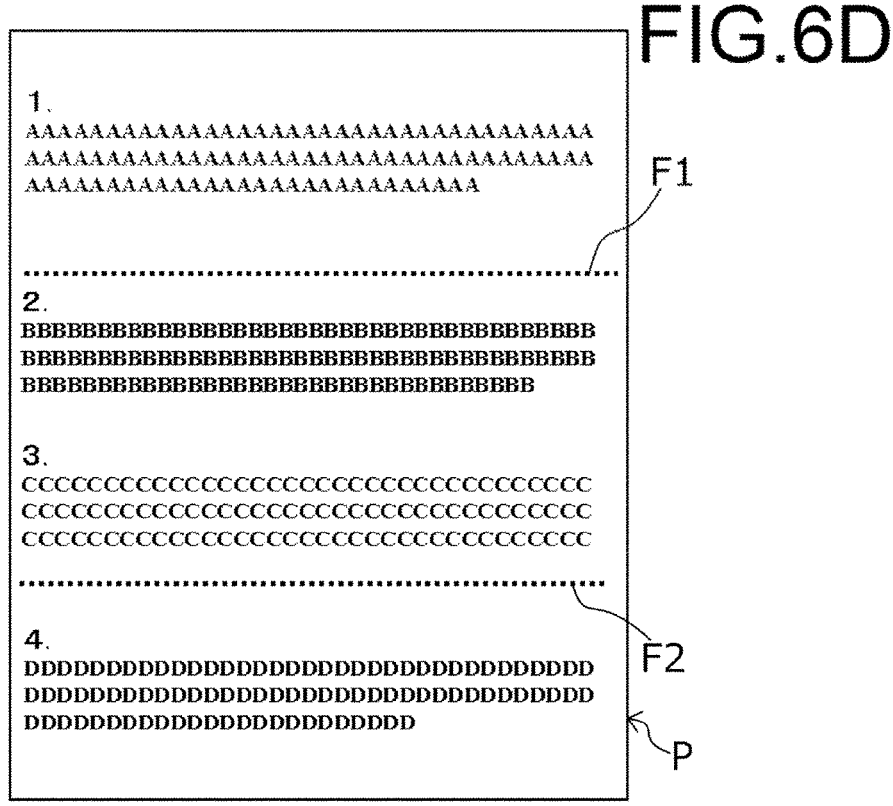
FIG. 6D illustrate an example (example 2) of images displayed on the display unit of an embodiment of an image forming apparatus according to the present disclosure.

In the following, an embodiment according to the present disclosure will be explained with reference to the drawings. FIG. 1 is a diagram illustrating the configuration of an image forming apparatus 1 of an embodiment according to the present disclosure. This image forming apparatus 1 is a multifunction peripheral (MFP: Multi Function Printer). This image forming apparatus 1 has a printing function of receiving printing data from a personal computer (computer) via a network, forming output on a medium (paper) based on the printing data and outputting the medium. Moreover, the image forming apparatus 1 has a copying function of optically reading images that are recorded on paper and generating printing data, forming the printing data on other paper, and outputting the paper. In this image forming apparatus 1, the printing data is edited on the premise that the paper outputted in this way will be folded and accommodated in an envelope (paper accommodating body). Typically, the types (sizes) of paper are predetermined according to standards such as A0 to A10 and B0 to B10. The types (type:size) of commercially sold envelopes are also predetermined according to standards such as rectangular No. 1 to 30.

This image forming apparatus 1, in order to achieve a printing function, includes a printing-data-receiving unit 11A for obtaining printing data that is described in a page description language such as Prescribe, PostScript (both registered trademarks), and the like from a personal computer (computer) via a network. Moreover, the image forming apparatus 1, in order to achieve a copying function, includes a document-reading unit 11B for optically reading an image that is formed on paper and generating printing data from the read two-dimensional image. Both the printing-data-receiving unit 11A and the document-reading unit 11B function as a printing-data-input unit 11 for obtaining printing data. Furthermore, the image forming apparatus 1 includes an output unit 12 that uses the printing data to form an image on paper, and output the paper. In the output unit 12, an image is formed on paper using toner, then fixed. The printing-data-receiving unit 11A, the document-reading unit 11B, and the output unit 12 are the same as a unit normally used in an image forming apparatus having the same printing function and copying function. However, the paper is outputted from the output unit 12 after editing (changing) the printing data above.

In addition, an operation panel 13 that includes a plurality of operation keys and that receives operations by a user, and a display unit 14 that includes a display and that is capable of displaying various information are provided. For example, operation-mode settings, and the type of envelope planned to be used are inputted from the operation panel 13. The display unit 14 displays an image based on printing data before editing, or an image based on printing data after editing before actual output is performed. The user can view the image and confirm whether or not the current printing settings are appropriate.

Moreover, a printing-data-editing unit 15A is provided in the image forming apparatus 1, and that printing-data-editing unit 15A is a processor for editing the image to be outputted that recognizes and corrects the original printing data. In this case, a character-recognizing unit 16 is provided for recognizing character strings in an image when text that is composed of characters is included in the image to be outputted. Particularly, when printing data is inputted to the document-reading unit 11B as a two-dimensional image, the character-recognizing unit 16 recognizes characters from the two-dimensional image using pattern recognition. The printing-data-editing unit 15A, by the character-recognizing unit 16, recognizes each of the characters and the positions of the characters in the image, and when necessary, corrects the printing data so as to change the positions.

Moreover, an envelope-recognizing unit (paper-accommodating-body-recognizing unit) 17 is provided in this image forming apparatus 1 as a processor for recognizing the type and vertical and horizontal sizes (for example, when the type is rectangular No. 3, 120 mm×235 mm) of the envelope that accommodates the outputted paper after being folded. In addition, a fold-setting unit 18 is provided as a processor for recognizing the folding pattern (folding method: three fold, four fold, and the like) and the locations of the folds on the paper in this case according to the type (size) of paper that is recognized from the printing data and the like, and according to the size of the envelope. Furthermore, in the case in which the folding pattern is determined, a fold-location-adjusting unit 15B is also provided as a processor for recognizing the positions of the folding lines on the paper in the folding pattern, and finely adjusting the positions. The fold-location-adjusting unit 15B also creates printing data for printing folding marks on the paper for indicating the positions of the folding lines.

The printing-data-editing unit 15A and the fold-location-adjusting unit 15B function as a positional-relationship-adjusting unit 15 for adjusting the positional relationship between the image that is outputted on the paper and the folding lines. The positional-relationship-adjusting unit 15 performs adjustment so that portions in the image that are not blank (for example, positions where characters are printed) do not overlap the folding lines. This adjustment is performed by finely correcting the printing data by the printing-data-editing unit 15A, and performed by finely correcting the positions of folding lines by the fold-location-adjusting unit 15B.

A control unit 10 is provided as a CPU for performing overall control of the image forming apparatus 1 having the configuration described above. In this image forming apparatus 1, as operating modes when performing output (printing output, copying output) from the output unit 12, there are two types of operating modes, a normal mode and a folding-compatible mode. FIG. 2 is a flowchart illustrating the operation that is performed by the control unit 10 during output. Here, it is presumed that single-side printing is performed, and a desired image is outputted on the surface of the paper.

Here, first, the control unit 10 acquires printing data from the printing-data-input unit 11 (printing-data-receiving unit 11A or document-reading unit 11B) (S1). Next, the control unit 10 recognizes whether or not the current setting is the normal mode or the folding-compatible output mode (S2). When the mode is not the folding-compatible output mode (is the normal mode) (S2: NO), normal output of paper is performed from the output unit 12 using the printing data and paper that corresponds to the printing data (S3), then processing ends. This operation is the same as the operation of a normal printing function or copying function.

When the mode is the folding-compatible output mode (S2: YES), the control unit 10 requests the user from the display unit 14 to input the type of envelope to be used from the operation panel 13. As a result, the envelope-recognizing unit 17 recognizes the type of envelope to be used (S4). Accordingly, when the envelope is rectangular No. 3, for example, the size is recognized to be 120 mm×235 mm. Alternatively, instead of inputting the envelope type, the size (vertical size×horizontal size) may be inputted. Here, the fold-setting unit 18 recognizes the type (size) of paper from the printing data, and from the size of the paper and the type of the envelope that is recognized as described above, is able to recognize a standard folding pattern as the folding pattern of the paper for accommodating the paper in this envelope (S5). For example, when the envelope is rectangular No. 3 above, and the paper is size A4, the standard folding pattern, as illustrated in FIG. 3, is a pattern in which the paper P is folded at two locations in the lengthwise direction using two folding lines F1, F2 (three fold). The fold-setting unit 18 is able to store a plurality of standard folding patterns beforehand according to the type of envelope and paper size. For example, in the case in which, as described above, the envelope is rectangular No. 3, and the paper is size A4, in addition to the three-fold pattern such as described above, patterns such as a four-fold pattern in which the paper is folded at three locations in the lengthwise direction and the like are stored. In a case such as this, it is possible to assign priority to the folding patterns, and a folding pattern in which the size after folding is closest to the size of the envelope can be given the highest priority. In the case above, the priority of the three-fold pattern is set as the highest, and here is recognized as the folding pattern. In the case where size instead of the type of envelope is specified, the folding pattern that is the same as in the case where a type of envelope having a size that is larger than and closest to this size is specified can be employed as a standard folding pattern.

Next, the control unit 10 causes the display unit 14 to display a preview image based on the acquired printing data, and to write the folding lines in the folding pattern above over that preview image (S6). FIG. 4A is an example of an image (before editing) that is formed on paper P according to inputted printing data. FIG. 4B illustrates an image that is displayed by writing folding lines F1, F2 over this image (image on the display unit 14). Here, the fold-setting unit 18 can recognize the locations where the folding lines F1, F2 and characters overlap. Then, the overlapped characters (character string) can be displayed in the image by highlighting the characters, displaying the characters in red, enclosing the characters in a rectangular frame, or the like. Here, the lower folding line F2 and the overlapped character string V1 that is enclosed in a rectangular frame overlap. As a result, the user is able to recognize the relationship between the image (character string) that is rendered on the paper P and the folding lines F1, F2 when this folding pattern is employed.

Next, the control unit 10 inquires of the display unit 14 whether to perform output in this state (S7). When the user, via the operation panel 13, replies indicating a desire to perform output in this state (S7: YES), the fold-location-adjusting unit 15B sets the positions of the folding lines F1, F2 to the state described above, and creates printing data for printing folding line marks. Then, the printing-data-editing unit 15A obtains printing data of the state above, and the output unit 12 acquires this printing data. As a result, the folding line marks are rendered on the back side as an image corresponding to the folding lines F1, F2 in FIG. 4B (S8). Then, the image illustrated in FIG. 4B is formed on the front side of the paper P (S3). However, when the outputted paper P is folded, the folding line F2 and the overlapping character string V1 in FIG. 4B will overlap.

The case will be explained in which the user does not desire to perform output in this state, but rather desires to change the positional relationship between the folding lines and the image (S7: NO). First, the control unit 10, via the display unit 14, inquires of the user whether or not the displayed folding pattern (three-fold pattern in FIG. 4B that uses folding lines F1, F2) is appropriate (S9). Here, it is only required to determine whether or not the folding pattern is appropriate, and it is not required to determine whether or not the positions of the folding lines are appropriate. When the user, via the operation panel 13, inputs that the folding pattern (three-fold) is not desired (S9: NO), the control unit 10 causes the user to set another folding pattern via the operation panel 13 (S10). As the method for performing this setting, there are the following methods and the like. When the priority is set as described above, the user selects the folding pattern that is next in priority (four-fold in the example above). Alternatively, the control unit 10 displays a plurality of other folding patterns via the display unit 14, and causes the user to select a folding pattern from among those. Alternatively, the control unit 10 may cause the user to input the folding lines, and the position and direction of the folding lines as appropriate.

Here, the case will be explained in which a four-fold folding pattern having three folding lines (F1, F2, F3) is newly set (S10). An output image and the folding lines F1 to F3 in the case where this folding pattern is set are again displayed by the display unit 14 as a preview image (S6). FIG. 4C is an example of an image that is displayed by the display unit 14 in this case. In this case, there are no characters that overlap the folding lines F1 to F3. When the user desires this output (S7: YES), output of this state is performed (S8, S3).

As a result, the user can fold the outputted paper P along the printed folding lines F1, F2, F3, and accommodate the paper P in the desired envelope. In the case of the state in FIG. 4C, overlapping of folding lines F1 to F3 and characters does not occur in this state, so the text that is printed on the paper P becomes easy to read.

When changing the positional relationship between the folding lines and the image is performed (S7: NO), and the folding pattern (three-fold) is appropriate (S9: YES), a folding line/printing data fine correction process (S11) for performing fine adjustment of at least one of the folding lines and the printing data is performed. The folding line/printing data fine correction process is mainly performed using the positional-relationship-adjusting unit 15 (printing-data-editing unit 15A, fold-location-adjusting unit 15B). In the following, the folding line/printing data fine correction process (S11) will be explained in detail.

FIG. 5 is a flowchart illustrating the details of the folding line/printing data fine correction process (S11). In the following explanation, it is presumed that the folding pattern is fixed as three-fold, and the state before the folding line/printing data fine correction process (S11) is performed is the state in FIG. 4B. Here, at least one of fine adjustment of the positions of the folding lines (folding locations) and fine adjustment of the position of the outputted image is performed.

In FIG. 3, even when the positions of the folding lines F1, F2 are changed a little in the vertical direction (lengthwise direction of the paper P), it is possible to accommodate the paper P that is folded with this folding pattern in the envelope. Under such restrictions, in FIG. 3, it is presumed that folding line F1 on the upper side can be moved within the range D1, and that folding line F2 on the lower side can be moved within the range D2. However, for example, when the position of the folding line F1 on the upper side is determined, for example, the movable range D2 of the folding line F2 on the lower side varies according to that position. In this relationship, for example, the interval L1 between the upper edge of the paper P in FIG. 3 and the folding line F1, the interval L2 between the folding lines F1, F2, and the interval L3 between the folding line L2 and the lower edge can be set so that L2>L1, L3, and L2 is less than the width inside the envelope. For example, when the position of the folding line F1 on the upper side is fixed first, the fold-setting unit 18 can set the allowable range D2 of the position of the folding line F2 on the lower side from this condition. Therefore, by the user performing control via the operation panel 13, the fold-location-adjusting unit 15B can finely adjust the positions of the folding lines F1, F2 so that the folding lines F1, F2 and characters do not overlap.

Consequently, in the flowchart in FIG. 5, the control unit 10 first inquires of the user whether or not to finely adjust the positions of the folding lines (S21). Here, when it is desired to perform this fine adjustment (S21: YES), the control unit 10 can cause the fold-location-adjusting unit 15B to perform fine adjustment of the positions of the folding lines F1, F2 (S22). When performing adjustment of the positions of the folding lines F1, F2 without depending on the operation by the user, preferably the folding lines F1, F2 are moved within a range so that folding lines F1, F2 and characters do no overlap and the amount of movement of the folding lines F1, F2 becomes a minimum.

After that, the control unit 10, as in the case of the preview image display (SG) described above, causes a preview image to be displayed using folding lines after position adjustment (S23). When the state before the folding line/printing data fine correction process (S11) is performed is the state in FIG. 4B, the image display (S23) for the case in which overlap of the folding lines F1, F2 and the characters is eliminated with the amount of movement of the folding lines F1, F2 being a minimum is illustrated in FIG. 6A. Here, the position of the folding line F1 on the upper side that does not overlap characters does not change, and the folding line F2 on the lower side moves a little toward the lower side. Incidentally, fine adjustment of the folding locations (S22) and the preview image display (S23) are repeated until the folding locations are recognized as being appropriate (S24: YES). For example, when adjustment of the positions of the folding lines F1, F2 is performed automatically as described above (S22) and the folding locations are not recognized as being appropriate (S24: NO), during readjustment (S22) it is possible to have this adjustment be performed by user operation.

When the folding locations are recognized as being appropriate (S24: YES), the control unit 10, via the display unit 14, inquires of the user whether or not to perform fine adjustment of the printing data (the image to be printed itself) (S25). In other words, the control unit 10 inquires whether or not fine adjustment of the folding locations described above (S22) alone is insufficient. When fine adjustment of the image to be printed is not necessary (S25: NO), the folding line/printing data fine correction process (S11) ends.

In the case of performing fine adjustment of the image to be printed (S25: YES), the control unit 10 sets the division locations that will be the boundaries of divisions in the image that will be outputted by the printing-data-editing unit 15A (S26), and thus causes the display unit 14 to display the image after being divided (divided image) (S27). In the case of automatically making these divisions, portions that will be blank (blank spaces) in the image to be displayed can be set as the boundaries when making divisions in the direction perpendicular to the folding lines F1, F2 (direction of the divisions). FIG. 6B is an example of a display imaged on the display unit 14 in this case. In FIG. 6B, blanks that are one line portion of characters in the image in FIG. 6A are recognized as the boundaries when performing division, and the image is divided into four image divisions G1 to G4 in the vertical direction that are each enclosed in dashed lines. The size (width in the vertical direction) of the blanks that will be the boundaries at this time can be appropriately set. The user looks at the image (S27), and can recognize whether or not the divisions (division locations) are appropriate (S28).

When the divisions are recognized as not being appropriate (S28: NO), setting of the division locations is performed again (S26). When doing this, when the division locations are recognized as not being appropriate (S28: NO) when the division locations are automatically set as described above (S26), for example, during readjustment (S26) the adjustment can be performed by user operation.

When the divisions are recognized as being appropriate (S28: YES), the printing-data-editing unit 15A finely adjusts the positions of the image divisions G1 to G4 in the vertical direction and sets the image divisions G1 to G4 so that none overlap the folding lines F1, F2 (S29). Then, the printing-data-editing unit 15A can change the printing data in this way. The control unit 10 then causes this state to be displayed again by the display unit 14 (S30). When this adjustment is performed automatically, the printing-data-editing unit 15A, under the restriction of reducing the movement amount of the image divisions G1 to G4, can move the image divisions G1 to G4 so that the folding lines F1, F2 and image divisions G1 to G4 do not overlap each other. This is the same as in the case of position adjustment of the folding lines (S22) described above. Alternatively, this operation can be performed by the user using the operation panel 13. FIG. 6C is an example of a preview image on the display unit 14 after this operation is performed (S30). In this case, each of the image divisions G2, G3, G4 are moved a little further toward the upper side than in the state in FIG. 6B. In doing so, the image divisions G2, G3 move within the area between the folding lines F1 and F2. As a result, overlapping of the folding lines F1, F2 and the image divisions G1 to G4 does not occur.

This operation is repeated until an indication is inputted from the operation panel 13 indicating that the user has determined the positional relationship between the folding lines F1, F2 and the image divisions G1 to G4 to be appropriate (S31: YES). When the positional relationship is determined to be appropriate, the folding line/printing data fine correction process (S11) ends. The case will be explained in which the positional relationship between the folding lines F1, F2 and the image divisions G1 to G4 are not determined to be appropriate (S31: NO). In this case, when performing position adjustment (S29) of the image divisions again, when the previous position adjustment (S29) was performed automatically, this can also be performed manually by the user. This is the same as the fine adjustment (S22) of the folding locations, and the setting (D26) of the division locations described above.

Incidentally, in the example above, dividing an image is performed based on locations that will be blanks, however, configuration is also possible in which the division locations can be set by an operation via the operation panel 13.

This kind of folding line/printing data fine correction process (S11) is repeated until printing is allowed (S9: YES) in the flowchart in FIG. 2. When printing is allowed (S9: YES) in the state (S11, S30) illustrated in FIG. 6C, the printing data set in this state is transmitted to the output unit 12, and outputted on the paper P. This image (S3) is illustrated in FIG. 6D. Here, the folding lines F1, F2 are displayed together with the character images. However, the folding lines F1, F2 are actually rendered on the back side of the paper P. Here, the folding lines F1, F2 and character images are rendered so as not to overlap, and the user can easily fold the paper P along the folding lines F1, F2. When doing this, the existence of the folding lines F1, F2 also prevent the text from becoming difficult to read.

Incidentally, as described above, the display of the printing lines is performed on the back side of the printing paper P, so this display cannot be seen by the user when reading the text on the front side of the paper P. However, when the paper P is thin, there may be cases when the display of the folding lines is visible through the paper surface. In order to make it difficult to see the display of the folding lines from the front side even in such a case as this, folding line marks J1, J2 that correspond to the folding lines F1, F2 can be displayed very small at only the corners on the back side of the paper as illustrated in FIG. 7 for example. In FIG. 7, for convenience, the folding lines F1, F2 are illustrated, however, in actuality, the folding lines F1, F2 will not be rendered at all, and only small folding line marks J1, J2 will be rendered. The folding line marks J1, J2 are rendered small enough so as not to overlap locations where characters are rendered on the paper P. When rendering folding line marks such as these, rendering may be performed not only on the back side, but may also be performed on the front side (on the same side as the side where the image to be outputted is rendered).

Incidentally, in the example above, it is presumed that the target images (character strings) to be outputted on the paper P are rendered on only one side (single-side printing). However, even in the case of performing double-side printing, the same procedure described above can be performed on both the front side and the back side. As a result, it is possible to prevent the folding lines from becoming an obstacle on both the front side and the back side. In this case, the folding lines (folding line marks), as illustrated in FIG. 7, are preferably displayed as small marks on the end sections on the front side or back side.

Moreover, in the example above, it is presumed that the image to be outputted is text (character string), however, even in the case of a typical image that is not characters or symbols, the same procedure can be performed. In this case, setting the locations of divisions when dividing the image (S26), for example, can be determined according to locations that will be blanks in the direction perpendicular to the folding lines (or in the case of color printing, locations that are rendered in the same color as the color of the paper P).

Furthermore, in the example above, a plurality of folding lines running in the horizontal direction (short direction of the paper P) are provided in parallel, and the positions in the vertical direction of the folding lines or the image (image divisions) are finely adjusted. However, depending on the folding pattern, there may be cases in which folding lines in the horizontal direction and folding lines in the vertical direction may be mixed. In such a case, position adjustment in the horizontal direction of folding lines in the vertical direction, or position adjustment in the horizontal direction of image divisions of which the division direction is taken to be the horizontal direction can be performed.

In addition, in the example above, the paper that is outputted is folded and accommodated in an envelope, however, the same can be applied in the case of using any paper accommodating body other than an envelope. Alternatively, even when it is not presumed that the paper will be accommodated in a paper accommodating body, and it is presumed that the paper will be merely folded, the configuration described above is similarly effective. In these cases, the folding pattern and the positions of the folding lines may be set by the user. In this case, good output can be obtained by performing editing (S25 to S31) of the printing data in FIG. 5. In this case, setting the folding pattern in the flowchart in FIG. 2 (S9, S10), and fine adjustment of the positions of the folding lines in the flowchart in FIGS. 5 (S21 to S24) do not need to be performed.

Moreover, in the example above, the image forming apparatus 1 is presumed to be a MFP that includes a display unit 14 for displaying an image such as illustrated in FIGS. 4A to 4C or FIGS. 6A to 6D, for example. However, for example, when the image forming apparatus acquires printing data via a network from a computer by a printing-data-receiving unit, these images can be displayed on the computer side. When doing this, operation that is performed using the operation panel 13 for adjusting the position of the folding lines or the image divisions can also be performed on the computer side. Therefore, in the configuration illustrated in FIG. 1, the display unit 14 and the operation panel 13 do not need to be integrated with the control unit 10, the output unit 12 and the like, and the same is true of the other components. In other words, each of the units described above may be connected via a network without being integrated, and this image forming apparatus is not limited to an image forming apparatus that includes the form as an apparatus that is configured by integrating all of the configurations in FIG. 1.

For example, when the image to be outputted is a long character string (text) and the characters and folding lines overlap, the characters may become difficult to read, so preferably the characters and folding lines are made to not overlap. In typical technology, a user can recognize the positional relationship between images and folding lines on paper after output, so can adjust the position of the overall image and the position of the folding lines, and it is not impossible to prevent the occurrence of this kind of situation. However, for example, when the image to be outputted occupies a large percentage of the overall paper, and there is a plurality of folding lines, there are cases in which it becomes impossible to perform adjustment so that characters do not overlap any of the folding lines. Moreover, even when such adjustment is possible, the adjustment work becomes complicated.

In other words, there is a demand for an image forming apparatus that can easily perform the work of adjustment so that after paper has been folded, the folding lines do not become an obstacle when looking at an image that is formed on the paper.

With the configuration described above, it is possible to easily perform the work of adjustment so that after paper has been folded, the folding lines do not become an obstacle when looking at an image that is formed on the paper.

What is claimed is:

1. An image forming apparatus that prints an image on paper, comprising:
   a printing-data-input unit that printing data for printing the image is inputted to;
   a fold-setting unit that recognizes a folding pattern as a pattern by which the paper is folded after being outputted, and positions of folding lines on the paper that are used in that folding pattern;
   a positional-relationship-adjusting unit that adjusts at least one of the positions of the folding lines and the printing data so that portions in the image that are not blank and the folding lines do not overlap on the paper; and
   an output unit that, after adjustment by the positional-relationship-adjusting unit, forms the image on the paper using the printing data, and outputs the paper.

2. The image forming apparatus according to claim 1, wherein
   the output unit
   renders folding line marks on the paper indicating the positions of the folding lines on the paper.

3. The image forming apparatus according to claim 2, wherein
   the output unit
   renders folding line marks outside the image on the front side of the paper that is the surface of the side of the paper where the image is formed, or on the back side of the paper that is the opposite side from the front side.

4. The image forming apparatus according to claim 1, further comprising a paper-accommodating-body-recognizing unit that recognizes a size of a paper accommodating body that accommodates the paper that is folded after being outputted; wherein
   the fold-setting unit recognizes the folding pattern and positions on the paper of the folding lines in that folding pattern from the size of the paper accommodating body and the size of the paper.

5. The image forming apparatus according to claim 4, wherein
the fold-setting unit
recognizes a plurality of the folding patterns that can be applied from the size of the paper accommodating body and the size of the paper, and causes a user to select the folding pattern.

6. The image forming apparatus according to claim 4, further comprising a display unit that displays the image and the folding lines on the paper for before and after adjustment by the positional-relationship-adjusting unit, respectively.

7. The image forming apparatus according to claim 6, wherein the display unit identifies and displays the locations in the image that overlap the folding lines.

8. The image forming apparatus according to claim 6, wherein
the positional-relationship-adjusting unit
causes the display unit to display a plurality of image divisions, each of which divides the image along a dividing direction that is a direction perpendicular to the folding lines with blank portions as boundaries, and changes the printing data so as to change the positions of the image divisions along the dividing direction on the paper.

9. The image forming apparatus according to claim 8, further comprising
a character-recognizing unit that recognizes characters in the image; and the positional-relationship-adjusting unit generates the image divisions from the image according to arrangement of the recognized characters.

* * * * *